United States Patent [19]

Kocsis

[11] Patent Number: 4,712,617

[45] Date of Patent: Dec. 15, 1987

[54] METHOD FOR CONTROLLING THE FLOW OF LIQUIDS THROUGH A SUBTERRANEAN FORMATION

[75] Inventor: Deborah L. Kocsis, Newark, Ohio

[73] Assignee: The Dow Chemical Company, Midland, Mich.

[21] Appl. No.: 914,959

[22] Filed: Oct. 3, 1986

[51] Int. Cl.$^4$ .................... E21B 33/138; E21B 43/20
[52] U.S. Cl. .................... 166/270; 166/295; 166/300
[58] Field of Search ............... 166/270, 294, 295, 300; 405/264; 523/130, 132

[56] References Cited

U.S. PATENT DOCUMENTS

| | | | |
|---|---|---|---|
| 3,502,149 | 3/1970 | Pence, Jr. .................... | 166/295 |
| 3,701,384 | 10/1972 | Routson et al. .................... | 166/292 |
| 3,730,271 | 5/1973 | Gall .................... | 405/264 X |
| 3,749,172 | 7/1973 | Hessert et al. .................... | 166/295 X |
| 3,759,857 | 9/1973 | Bracke . | |
| 3,785,437 | 1/1974 | Clampitt et al. .................... | 166/295 X |
| 3,809,160 | 5/1974 | Routson .................... | 166/294 |
| 3,875,697 | 4/1975 | Bracke .................... | 405/264 X |
| 3,909,423 | 9/1975 | Hessert et al. .................... | 166/270 X |
| 4,120,361 | 10/1978 | Threlkeld et al. .................... | 166/294 |
| 4,125,478 | 11/1978 | Sullivan et al. .................... | 252/316 |
| 4,199,625 | 4/1980 | Pilny et al. .................... | 166/295 X |
| 4,290,485 | 9/1981 | Free et al. .................... | 166/295 X |
| 4,291,069 | 9/1981 | Pilny .................... | 166/295 X |
| 4,440,228 | 4/1984 | Swanson .................... | 166/274 |

*Primary Examiner*—George A. Suchfield

[57] ABSTRACT

The permeability of subterranean formations, and hence, the mobility of fluids through the formation, can be controlled by introducing a carboxamide polymer and a hypohalite such as sodium hypochlorite to the formation at conditions such that the polymer has been cross-linked, either prior to its introduction or in situ, to form a gel. By this method, the permeability of highly porous zones can selectively be reduced. Therefore, in an enhanced recovery operation wherein a drive fluid is injected into the subterranean formation to force hydrocarbon therefrom, the drive fluid can more uniformly sweep the formation resulting in a more effective recovery process.

18 Claims, No Drawings

METHOD FOR CONTROLLING THE FLOW OF LIQUIDS THROUGH A SUBTERRANEAN FORMATION

BACKGROUND OF THE INVENTION

The present invention relates to a method for controlling the flow of fluids through subterranean formations.

It is well-known that subterranean formations comprise layers or zones of different permeabilities. In the recovery of hydrocarbon material such as oil or natural gas from a subterranean reservoir, highly porous or permeable zones often create significant problems.

For example, in enhanced or secondary oil recovery operations such as water or surfactant flooding wherein an aqueous fluid is injected into the formation to drive the hydrocarbon to a producing wellbore, a disproportionately high amount of the injected drive fluid by-passes through zones of high permeability into the producing wellbore without sweeping appreciable amounts of hydrocarbon from the reservoir. This greatly reduces the efficiency of the operation. In addition, excessive amounts of water are recovered along with the hydrocarbon.

Alternatively, water, normally in the form of brine, is commonly native to the formation. The communication of a water-containing strata with a producing wellbore via a highly permeable zone can cause excessive water to be produced along with the hydrocarbon. This results in a high pumping cost and a disposal problem for the recovered water.

Various solutions have been proposed heretofore to control the permeability of subterranean formations. For example, it has been proposed to place a solid plug of a material such as cement within the more permeable zones of the formation. Similarly, suspensions of finely divided solids have been pumped into the formation in an attempt to plug highly permeable zones. Materials employed in such attempts have included organic matter such as ground leather or ground walnut shells and inorganic materials such as clays and finely ground silica. Unfortunately, the use of solid plugs or finely divided solid powders has frequently proved unsuccessful due to the fact that the material fails to plug the zones of high permeability or, conversely, the material indiscriminately and permanently plugs both hydrocarbon bearing zones as well as other zones in the formation, thereby resulting in a permanent loss of the desired hydrocarbon fluid. Moreover, even when the operation is successful, completely plugging portions of the formation does not significantly increase the recovery operation.

Alternatively, it has been proposed to control the permeability of a formation and hence modify the mobility of a fluid through the formation using a viscous fluid pumped into the hydrocarbon-bearing formation. For example, U.S. Pat. No. 3,039,529 describes incorporating a partially hydrolyzed polyacrylamide into an aqueous drive fluid to increase its viscosity and hence to control its mobility through the formation. Unfortunately, substantial quantities of the polymer are employed to maintain a desirably high viscosity. Moreover, in many cases, particularly in a highly porous zone of relatively low porosity, substantial quantities of the drive fluid are recovered with the hydrocarbon.

As an alternative method for controlling the mobility of a drive fluid and/or water production in an oil-producing well, it has been proposed to plug some of the more porous formations by introducing a water-soluble acrylamide-carboxylic acid copolymer into the formation (see, e.g., U.S. Pat. No. 3,087,543). The polymer is forced into the formation and reduces the permeability of the formation to water without substantially decreasing the permeability of the same formation to hydrocarbon. Unfortunately, any beneficial effects only last for a relatively short time because of the inherent water-solubility of the polymer.

An improved method for controlling the flow of a fluid through a subterranean formation consists of injecting a cross-linked, water-insoluble gel of a water-soluble polymer into the formation (U.S. Pat. No. 3,921,733). Similarly, it has also been proposed to add discrete, spheroidal microgels of a water-swellable or water-swollen cross-linked polymer to the formation to control the mobility of fluids (see, e.g., U.S. Pat. Nos. 4,182,417 and 4,291,069). These cross-linked polymers have been shown to be effective in modifying the permeability of the formation to improve the efficiency of the recovery operation, thereby producing hydrocarbon which contains lesser amounts of water or other drive fluid. Unfortunately, due to their high viscosities, it is often difficult to pump the cross-linked polymer into the formation.

Alternatively, it has also become a practice to modify the control fluids in a formation by introducing a water-soluble polymer into the formation and cross-linking the polymer in situ using a metallic (e.g., sodium dichromate/sodium bisulfite) or an organometallic (e.g., aluminum citrate) cross-linking agent to form a water-soluble gel(see, e.g., U.S. Pat. Nos. 3,780,806; 3,785,437; 3,809,160 and 3,701,384). Unfortunately, the cross-linking of water-soluble polymers such as polyacrylamides and hydrolyzed polyacrylamides using a metallic or organometallic cross-linking agent can be difficult to control. Moreover, other materials present in the formation such as surfactants, soluble anions or dissolved gases can interfere with the cross-linking of the polymer.

In view of the deficiencies of the prior art methods, it remains highly desirable to provide an improved method for modifying the permeability of subterranean structures and hence, the flow of fluids therethrough.

SUMMARY OF THE INVENTION

Accordingly, in one aspect, the present invention is such a method for reducing the permeability of the more porous zones in a subterranean formation. Specifically, the method of the present invention comprises contacting the subterranean formation with at least one cross-linkable, water-soluble polymer having pendant carboxamide groups and a hypohalite cross-linking agent at conditions such that the polymer is or has been cross-linked to form a gel.

Using a hypohalite to cross-link the carboxamide polymer, a stable gel particularly useful for modifying the permeability of a subterranean formation is formed. The resulting gel is generally of lower toxicity and is more resistant to acidic or basic injection fluids than the cross-linked gels, formed by the methods of the prior art, which are used for the same purpose. The cross-linking reaction is also not found to be as significantly affected by other agents which may be present in the formation as is a metallic or an organometallic gelling agent. Moreover, the properties of the cross-linked polymeric gel are more easily controlled than when using a metallic or an organometallic gelling agent.

Using the described techniques, the permeability of the highly porous zones can be selectively reduced. For example, by the method of the present invention, the amounts of water native to the formation which are recovered in the production of a hydrocarbon can be effectively reduced. In addition, in a secondary or tertiary oil recovery operation or other operation in which a fluid is injected into an injection well to drive the oil or other hydrocarbon towards a producing wellbore, there is less tendency for the drive fluid to channel along or through the more permeable zones of the formation. As a result, the hydrocarbon is more uniformly forced towards the producing wellbore and the overall efficiency of the operation improved.

In another aspect, the present invention is such an improved enhanced oil recovery method. Specifically, in this aspect, the enhanced oil recovery method comprises injecting an aqueous drive fluid through an injection wellbore into a hydrocarbon-bearing formation to drive the hydrocarbon from the formation to a producing wellbore. The improvement in the method comprises introducing, through the injection wellbore, into the formation, a water-soluble carboxamide polymer and a hypohalite cross-linking agent in amounts and at conditions such that the polymer is or has been cross-linked to form a gel thereby restricting the passage of the drive fluid through the more permeable zones of the formation.

DETAILED DESCRIPTION OF THE INVENTION

The cross-linkable polymers suitably employed in the practice of the present invention are polymers (referred to herein as "carboxamide polymers") bearing pendant carboxamide groups with a carboxamide group being represented by the formula:

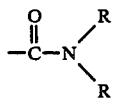

wherein each R is individually hydrogen, alkyl or hydroxyalkyl, provided at least one R is hydrogen. Advantageously, the carboxamide polymers are at least inherently water-dispersible, i.e., can be dispersed in water to form a stable dispersion without the aid of a surfactant, and preferably, are water-soluble such that they are capable of forming at least a one weight percent solution when dispersed in an aqueous liquid, including aqueous acid or aqueous base. More preferably, the carboxamide polymer is soluble in water to the extent of at least 5 weight percent and most preferably to an extent of 20 percent of more by weight.

The carboxamide polymer can be a homopolymer of an ethylenically unsaturated carboxamide monomer, such as acrylamide, methacrylamide, fumaramide, ethacrylamide or the like, a copolymer of one or more carboxamide monomer(s) or a copolymer of two or more carboxamide monomer(s) with one or more other ethylenically unsaturated monomers copolymerizable therewith. Examples of copolymerizable monomers are water-soluble comonomers including ethylenically unsaturated anionic monomers such as unsaturated aliphatic acids and anhydrides, e.g., acrylic acid, methacrylic acid, maleic anhydride and their water-soluble salts, particularly alkali metal salts such as sodium acrylate or sodium methacrylate, and ethylenically unsaturated sulfonic acids such as vinyl benzyl sulfonic acid; ethylenically unsaturated cationic monomers such as aminoalkyl esters of unsaturated carboxylic acids, e.g., 2-aminoethyl methacrylate, and ethylenically unsaturated sulfonium compounds; nonionic water-soluble comonomers such as vinylesters of saturated carboxylic acids, e.g., vinyl acetate and vinyl propionate and the like.

In addition, various water-insoluble monomers such as monovinylidene aromatic compound, e.g., styrene; a vinyl halide, e.g., vinyl chloride or vinylidene chloride; and hydroxyalkyl and alkyl esters of $\alpha,\beta$-ethylenically unsaturated carboxylic acids such as ethyl acrylate, methyl acrylate, butyl acrylate, methyl methacrylate, and hydroxyethyl acrylate can be employed in preparing the carboxamide polymer. It is understood that the specific comonomers employed and their concentrations are selected so that they do not react with the amide functionality of the carboxamide monomer or otherwise substantially interfere with the cross-linking reaction. Amide polymers are sometimes subject to some degree of hydrolysis during preparation or may purposefully have a portion of their amide groups hydrolyzed to carboxylate groups during or after preparation. For the purposes of this invention, such partially hydrolyzed amide polymer is equivalent to the corresponding copolymer of the carboxamide monomer and unsaturated aliphatic acid or acid-salt. Preferably, the carboxamide polymer is a homopolymer of acrylamide or a copolymer of acrylamide and an unsaturated carboxylic acid, preferably acrylic acid, or salt thereof.

Also included within carboxamide polymers which can be employed in the practice of the present invention, are those graft polymers wherein the amide monomer or other suitable monomers are grafted on cellulosic polymers such as cellulose, methylated cellulose and hydroxypropyl and methyl cellulose.

Preferably, the carboxamide polymer is a polymer wherein from about 50 to about 100 mole percent of the polymerized monomer units have pendant carboxamide groups. More preferably, from about 70 to about 100 mole percent and most preferably from about 80 to about 100 mole percent of polymerized monomer units contain carboxamide groups.

The molecular weight at which the polymer is most advantageously prepared is dependent on the specific monomeric components and cross-linking agent employed and the specific end-use application. Provided the carboxamide polymer has a sufficient molecular weight to react with the polyaldehyde to cross-link to a gel of desired properties, the molecular weight of the amide polymer is not particularly critical. The viscosity of an aqueous solution of the carboxamide polymer is an index of its molecular weight. In general, it is desirable that the carboxamide polymers have a molecular weight such that the desired amounts of polymer can be formed in an aqueous solution without producing excessive viscosity such as to render the solution difficult or impossible to pump. For example, the carboxamide polymers can have a significantly low molecular weight such that the viscosity of a 40 weight percent solution in water is only about 50 centipoise. Alternatively, the method of the present invention can alos be employed when the carboxamide polymer has a molecular weight characterized by a viscosity of as high as 60 centipoise for an aqueous 0.2 percent by weight solution of the polymer. In practice, to effectively influence the permeability of the subterranean formation, it is preferred to use solutions containing from 0.05 to 2 weight percent of the carboxamide polymer. In view of this, for ease of handling and placing the carboxamide polymer into the pore structure, an aqueous 20 percent by weight solution of carboxamide polymer is preferably characterized by a viscosity of from about 10,000 to about 30,000 centipoise measured using a Brookfield Viscometer, LVT Type (No. 5 spindle at 20 rpm) at 23° C.

The carboxamide polymer can be prepared in an aqueous solution using a variety of known techniques. For example, the carboxamide monomer(s) or monomer mixture containing the carboxamide monomer(s) can be dissolved in water and solution polymerization using free radical initiation, e.g., a redox catalyst system such as a peroxide-bisulfite system, or a peroxide or azo catalyst with controlled heating. Alternatively, the polymer may be prepared as a water-in-oil suspension or emulsion comprising a continuous phase of a water-insoluble liquid such as a liquid hydrocarbon and a disperse phase of droplets of an aqueous liquid containing the carboxamide polymer using techniques such as described in U.S. Pat. No. 3,284,393. Subsequently, the desired polymer solution can be prepared by inverting the emulsion, for example, with the aid of an inverting surfactant, to form an aqueous solution of the polymer. Alternatively, the amide polymer can be dried and redissolved in an aqueous liquid to form the suitable aqueous solution.

The hypohalite employed to cross-link the carboxamide polymer is suitably any hypohalite salt, including metal hypohalites, capable of cross-linking the carboxamide polymer. Advantageously, the hypohalite salt employed in the practice of the present invention is an alkali metal hypochlorite or alkali metal hypobromite, with an alkali metal hypochlorite being preferred. More preferably, the hypohalite is sodium or potassium hypochlorite, with sodium hypochlorite being most preferred.

The hypohalite salt is advantageously employed in the form of an aqueous solution prepared by dissolving the corresponding free halogen in a slight molar excess of alkali metal hydroxide or other relatively strong base with cooling to prevent the formation of halites or halates. In general, to stabilize the hypohalite solution, a slight excess of base is beneficially employed to provide an aqueous solution of hypohalite having a pH of at least about 12 and preferably at least about 13. Although the concentration of the hypohalite in solution can vary widely, in general, the hypohalite solution is prepared containing from about 5 to about 10 weight percent of the hypohalite salt and the solution diluted to from about 0.1 to about 0.5, weight percent prior to use. For economical reasons, it is most preferable to employ a commercial household bleach which is an aqueous solution containing about 5 to about 5.5 weight percent of sodium hypochlorite, an approximately equimolar proportion of sodium chloride and sufficient excess of sodium hydroxide to provide a solution having a pH of 13.5 or slightly higher. In commercial bleach, the stabilizing excess of NaOH corresponds to about 0.3 to 1 percent by weight of the solution.

The amounts of the hypohalite cross-linking agent most advantageously employed in the practice of the present invention are dependent on a variety of factors including the specific carboxamide polymer and hypohalite cross-linking agent employed, the conditions at which the cross-linking reaction is conducted, particularly the temperature and pH of the liquid in which gelation occurs and the desired properties of the resulting cross-linked product.

In normal practice, the hypohalite is advantageously employed in an amount from 1 to about 1000, preferably from about 10 to about 100, millimoles of hypohalite anion per mole of carboxamide moiety in the amide polymer.

In the practice of the present invention, the carboxamide polymer and hypohalite are introduced into the subterranean formation at conditions such that the carboxamide polymer is cross-linked, either prior, during or subsequent to its introduction into the formation, to form a gel. Although the carboxamide polymer can be cross-linked using the hypohalite to form a gel and the gel subsequently introduced into the subterranean formation, it is generally more advantageous if the gelling of the polymer is delayed until its introduction into the subterranean formation.

In general, solutions, at the desired concentrations of the carboxamide polymer and hypohalite salt, are advantageously added simultaneously or sequentially (preferably, the solution of the polymer being followed by the solution of the hypohalite) to the subterranean formation. Although any suitable liquid can be employed in forming the solutions of desired concentrations, the solutions of the carboxamide polymer and hypohalite salt are generally prepared using an aqueous liquid. Either tap water or deionized water can be employed in preparing the aqueous solution(s). However, it will often be more convenient to use the brine native to the subterranean formation to prepare an aqueous solution of the polymer or hypohalite. In addition, the aqueous liquid can be a mixture of water and a water-miscible organic liquid such as a lower aldehyde, e.g., methanol or ethanol; an organic acid; a glycol such as ethylene glycol or the like.

By varying the specific carboxamide polymer and hypohalite employed and by adjusting the temperature and/or pH of the reaction mixture, a wide range of gel times can be obtained and conditions are selected accordingly.

For example, the cross-linking reaction, particularly the rate of the reaction, is influenced, to a substantial extent, by the pH of the aqueous medium in which the reaction occurs. In general, to obtain a desired rate of cross-linking, the reaction mixture is advantageously maintained at a pH at least about 7. The maximum pH of the reaction mixture is advantageously less than about 12. Preferably, the pH is maintained within the range of about 7 to about 9, more preferably between about 7.2 and about 8.5. For optimum gel formation, the reaction medium most preferably exhibits a pH of from about 7.5 to about 8.5.

In general, the aqueous medium found in subterranean formations and/or employed in making the solution of the polymer or hypohalite do not possess such pH. therefore, it is normally desirable to add a basic material to the formation to cause cross-linking and gelation to occur within a reasonable amount of time. Generally, any base capable of generating the desired pH which does not otherwise interfere with the cross-linking reaction is usefully employed herein. Examples of basic materials which can advantageously be employed herein include alkali metal hydroxides; metal phosphates such as trisodium phosphate; metal carbonates such as disodium carbonate, alkylamines such as dimethylamine, methylamine and trimethylamine; and other organic bases such as ethylene diamine. Of the foregoing basic materials, alkali metal hydroxides, particularly sodium hydroxide and potassium hydroxide, and the metal phosphates, particularly trisodium phosphate are preferred.

In a preferred method, an aqueous solution of the carboxamide polymer, preferably containing from about 0.1 to about 4, more preferably from about 0.2 to about 2.5, most preferably from about 0.05 to about 2, weight percent of the polymer is mixed with the desired amounts of an aqueous solution containing from about 0.1 to about 20, more preferably about 0.2 to about 15, most preferably from about 0.25 to about 10, weight percent of the hypohalite and the resulting mixture introduced to the formation. Subsequently, if employed, the basic material, preferably in the form of an aqueous solution comprising from about 0.01 to about 5, more preferably from about 0.1 to about 1, weight percent of the basic material is added to the subterranean formation.

In the practice of the present invention in conjunction with the enhanced recovery of hydrocarbons using a fluid drive, i.e., a water or gas flood, the enhanced oil recovery operation is continued in a conventional manner until undesirable amounts of the drive fluid break through into the producing wellbore. At such time, the carboxamide polymer, hypohalite and, if employed, the basic material are introduced into the formation at conditions to cross-link the polymer and form a gel at the desired depth in the formation. In general, the introduction of the drive fluid is interrupted during the addition of the carboxamide polymer, hypohalite and other components and, subsequent thereto, to allow cross-linking of the polymer. Following gel formation, the drive fluid can be re-initiated for further recovery of the hydrocarbon from the hydrocarbon containing strata.

The following examples illustrate the invention but are not to be construed to limit its scope. All parts and percentages are by weight unless otherwise indicated.

EXAMPLE 1

To 100 milliliters (mls) of an aqueous solution containing about 1.5 percent of a polymer of acrylamide (30 percent hydrolyzed) having a weight average molecular weight of about five million and about 2 percent potassium chloride is added 2 mls of a 5 weight percent solution of household bleach (5.25 percent sodium hypochlorite). The resulting mixture is mixed thoroughly. Within an hour after initial mixing, a clear gel is formed. The gel reaches its final strength in about twenty-four hours. At this time, the gel is rigid and does not flow. The gel is stable and remains essentially unaffected to an aqueous buffer material having a pH of 3.2 and to an aqueous base solution containing about 2 percent sodium hydroxide.

EXAMPLE 2

To 100 mls of a fresh water solution containing about 2 percent of a low molecular weight polymer of acrylamide (non-hydrolyzed) having a weight average molecular weight of about 500,000 is added 10 mls water containing 0.8 percent trisodium phosphate and 4 percent sodium hypochlorite. The resulting mixture is mixed thoroughly. Within an hour after initial mixing, a clear gel is formed. The gel reaches its final strength in about twenty-four hours. At this time, the gel flows when acted upon the by the force of gravity. Specifically, the gel deforms when inverted and hangs from the container. The gel is stable and remains essentially unaffected to an aqueous buffer material having a pH of 3.2 and to an aqueous base solution containing about 2 percent sodium hydroxide.

EXAMPLE 3

In an enhanced oil recovery operation using a water-flooding technique, a well is producing little oil with a concurrent recovery of excess amounts of water which is being employed as the drive fluid. The method of the present invention can be used to control the mobility of the drive fluid in the following manner.

To 8,500 kg of an aqueous solution containing about 20 percent of a homopolymer of acrylamide (12 percent hydrolyzed) having a molecular weight of 500,000 which aqueous solution has a pH of about 11 and a viscosity of about 20,000 centipoise at 25° C. as determined using a Brookfield LVT viscometer, No. 5 spindle at 20 rpm is added sufficient amounts of available field brine to make a two percent solution of the polymer. To the resulting polymer solution is added 4,000 grams (g) of a commercial bleach (5.25 percent sodium hypochlorite) and 834 grams of a 1 percent aqueous solution of sodium triphosphate. The resulting mixture comprises about 100 millimoles of hypohalite per mole of carboxamide moiety on the polymer. The resulting solution is thoroughly mixed and then injected into the formation through an injection wellbore. Following the additon of the solution into the formation, 85,000 kg of water are added to the formation to push the mixture into the formation and away from the wellbore. The injected materials are allowed to stand for 48 hours. After that period, water flooding is again commenced at the same conditions as prior to the treatment. Within several days, an increase in the average output of oil and a decrease in the average output of water is noticed.

What is claimed is:

1. A method for reducing the permeability of the more porous zones in a subterranean formation, the method comprising contacting the subterranean formation with at least one cross-linkable, water-soluble polymer having pendant carboxamide groups and a hypohalite salt cross-linking agent at conditions such that the polymer is or has been cross-linked to form a gel.

2. The method of claim 1 wherein the carboxamide polymer is a homopolymer of an ethylenically unsaturated carboxamide monomer, a copolymer of two or more ethylenically unsaturated carboxamide monomers or a copolymer of one or more ethylenically unsaturated carboxamide monomer and one or more other ethylenically unsaturated monomer copolymerizable therewith.

3. The method of claim 2 wherein the carboxamide polymer is a homopolymer of an ethylenically unsaturated carboxamide monomer or a copolymer of an ethylenically unsaturated carboxamide monomer and unsaturated aliphatic acid or salt thereof.

4. The method of claim 3 wherein the carboxamide polymer is a copolymer of acrylamide and an unsaturated carboxylic acid or salt thereof.

5. The method of claim 1 wherein the hypohalite salt is an alkali metal hypohalite.

6. The method of claim 5 wherein the hypohalite salt is sodium or potassium hypochlorite or hypobromite and is employed in an amount from 1 to about 1000 millimoles of hypohalite anion per mole of carboxamide moiety in the carboxamide polymer.

7. The method of claim 5 wherein the hypohalite salt is sodium hypochlorite which is employed in an amount from about 10 to about 100 millimoles of hypochlorite anion per mole of carboxamide moiety in the carboxamide polymer.

8. The method of claim 1 wherein the hypohalite salt is introduced into the subterranean formation either concurrently with or sequentially to the polymer.

9. An improved method for the enhanced oil recovery of a hydrocarbon from a subterranean formation, the enhanced oil recovery method comprising injecting an aqueous drive fluid through an injection wellbore into a hydrocarbon-bearing formation to drive the hydrocarbon from the formation to a producing wellbore wherein the improvement in the method comprises introducing, through the injection wellbore, into the formation, a water-soluble carboxamide polymer and a hypohalite salt cross-linking agent in amounts and at conditions such that the polymer is or has been cross-linked to form a gel, thereby restricting the passage of the drive fluid through the more permeable zones of the formation.

10. The method of claim 9 wherein the carboxamide polymer is a homopolymer of an ethylenically unsaturated carboxamide monomer, a copolymer of two or more ethylenically unsaturated carboxamide monomers or a copolymer of one or more ethylenically unsaturated carboxamide monomer and one or more other ethylenically unsaturated monomer copolymerizable therewith.

11. The method of claim 10 wherein from about 70 to about 100 mole percent of the polymerized monomer units contain carboxamide groups.

12. The method of claim 11 wherein the carboxamide polymer is a homopolymer of an ethylenically unsaturated carboxamide monomer or a copolymer of an ethylenically unsaturated carboxamide monomer and unsaturated aliphatic acid or salt thereof.

13. The method of claim 9 wherein the hypohalite salt is an alkali metal hypohalite.

14. The method of claim 13 wherein the hypohalite salt is sodium hypochlorite which is employed in an amount from about 10 to about 100 millimoles of hypochlorite anion per mole of carboxamide moiety in the carboxamide polymer.

15. The method of claim 9 wherein the hypohalite salt is introduced into the subterranean formation either concurrently with or sequentially to the polymer.

16. The method of claim 15 wherein a basic material is introduced into the subterranean formation prior to, simultaneous with or subsequent to introducing the carboxamide polymer and the hypohalite salt.

17. The method of claim 16 wherein the basic material is an alkali metal hydroxide or a metal phosphate.

18. The method of claim 9 wherein the injection of the drive fluid is interrupted during the addition of the polymer and hypohalite salt and for a period of time subsequent thereto sufficient to gel the polymer.

* * * * *